US007657180B2

(12) United States Patent  
Miyazaki et al.

(10) Patent No.: US 7,657,180 B2
(45) Date of Patent: Feb. 2, 2010

(54) COMMUNICATION PATH CALCULATION METHOD AND MODULE

(75) Inventors: Keiji Miyazaki, Kawasaki (JP); Yasuki Fujii, Kawasaki (JP); Shinya Kanoh, Kawasaki (JP); Akira Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 544 days.

(21) Appl. No.: 11/480,847

(22) Filed: Jul. 6, 2006

(65) Prior Publication Data

US 2007/0212067 A1  Sep. 13, 2007

(30) Foreign Application Priority Data

Mar. 8, 2006   (JP)   ............................. 2006-062721

(51) Int. Cl.
*H04J 14/02*   (2006.01)
(52) U.S. Cl. ............................. 398/83; 398/49; 398/57
(58) Field of Classification Search ................... 398/19, 398/45, 46, 57, 49, 58, 83
See application file for complete search history.

(56) References Cited

U.S. PATENT DOCUMENTS

| 7,145,704 B1* | 12/2006 | Islam | ........................ 359/108 |
| 2004/0190900 A1* | 9/2004 | Yagyu | ........................ 398/57 |
| 2006/0013584 A1* | 1/2006 | Miyazaki | ..................... 398/19 |
| 2006/0092941 A1* | 5/2006 | Kusama | ...................... 370/392 |

FOREIGN PATENT DOCUMENTS

WO   2004/010620   1/2004

* cited by examiner

*Primary Examiner*—Dzung D Tran
(74) *Attorney, Agent, or Firm*—Staas & Halsey LLP

(57) ABSTRACT

The present invention relates to a communication path calculation method and module. More particularly, the present invention provides a communication path calculation method and module that are implemented or incorporated in a transmission apparatus including a ROADM or the like which performs WDM communication, advertises information on a wavelength which can be added or dropped, as information on a link, and uses the information to autonomously calculate a communication path. Optical transmission equipment that is accommodated in a WDM network over which a wavelength-division multiplexed signal is transferred includes a reconfigurable OADM module. For calculation of a communication path, the OADM module creates a link table listing clients of the own equipment and connected WDMs, and advertises the link table to the other pieces of equipment accommodated by the network as pieces of information on restrictions to be imposed on routing from the own equipment. The other pieces of equipment each receive and store the advertised pieces of information on restrictions to be imposed on routing, and use the pieces of information as pieces of information on restrictions to be imposed on a calculation to calculate a communication path from the own equipment.

5 Claims, 8 Drawing Sheets

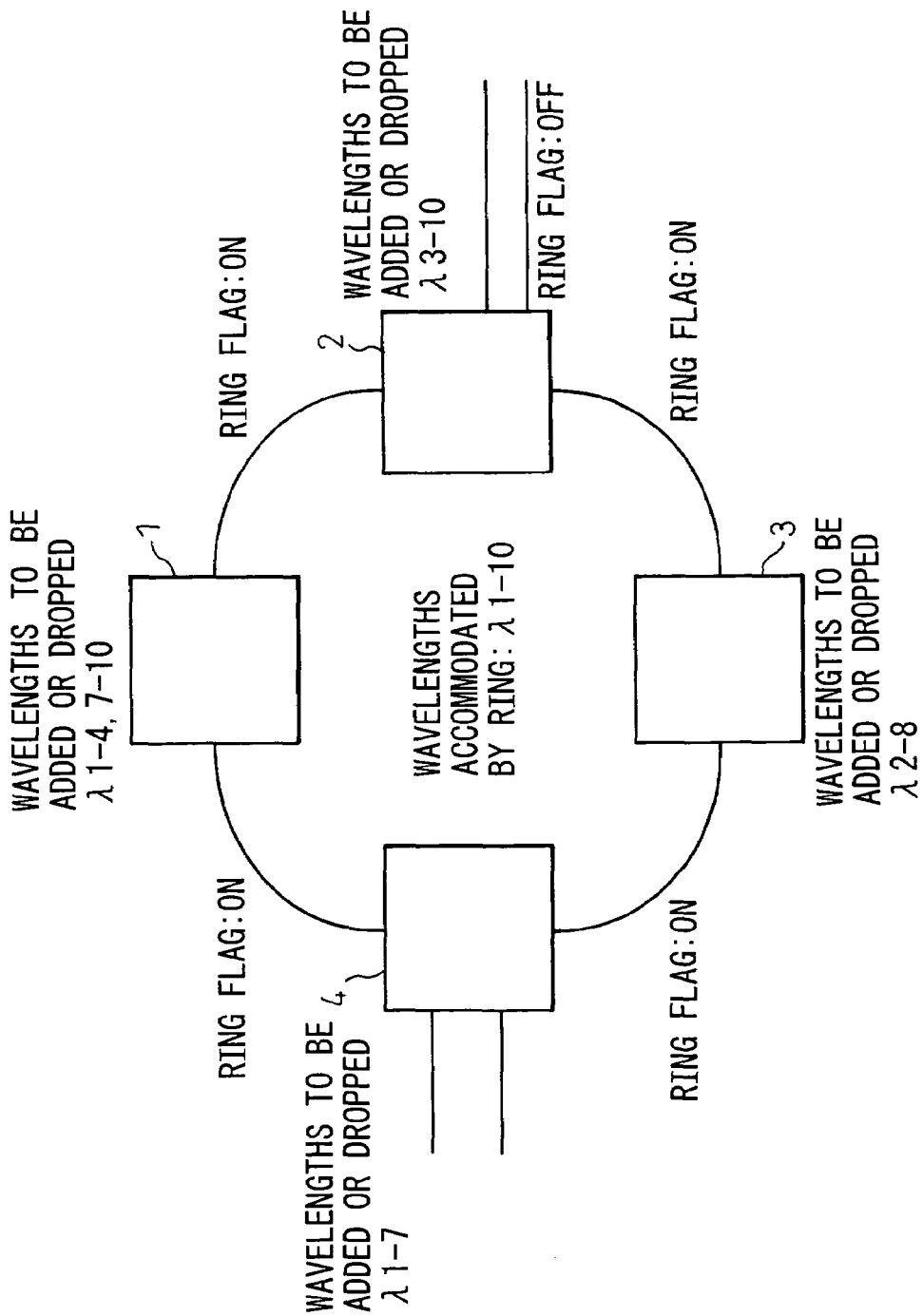

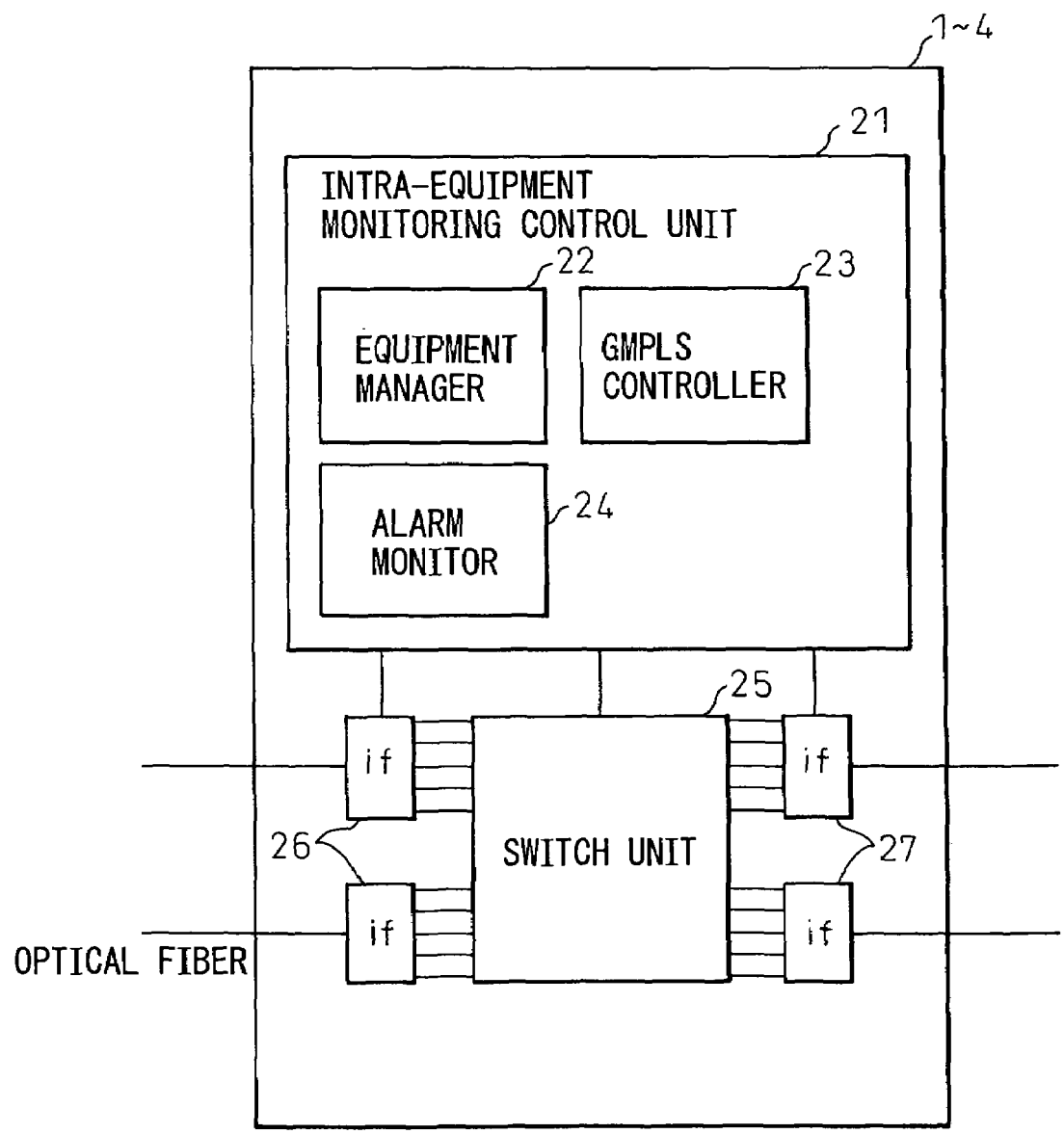

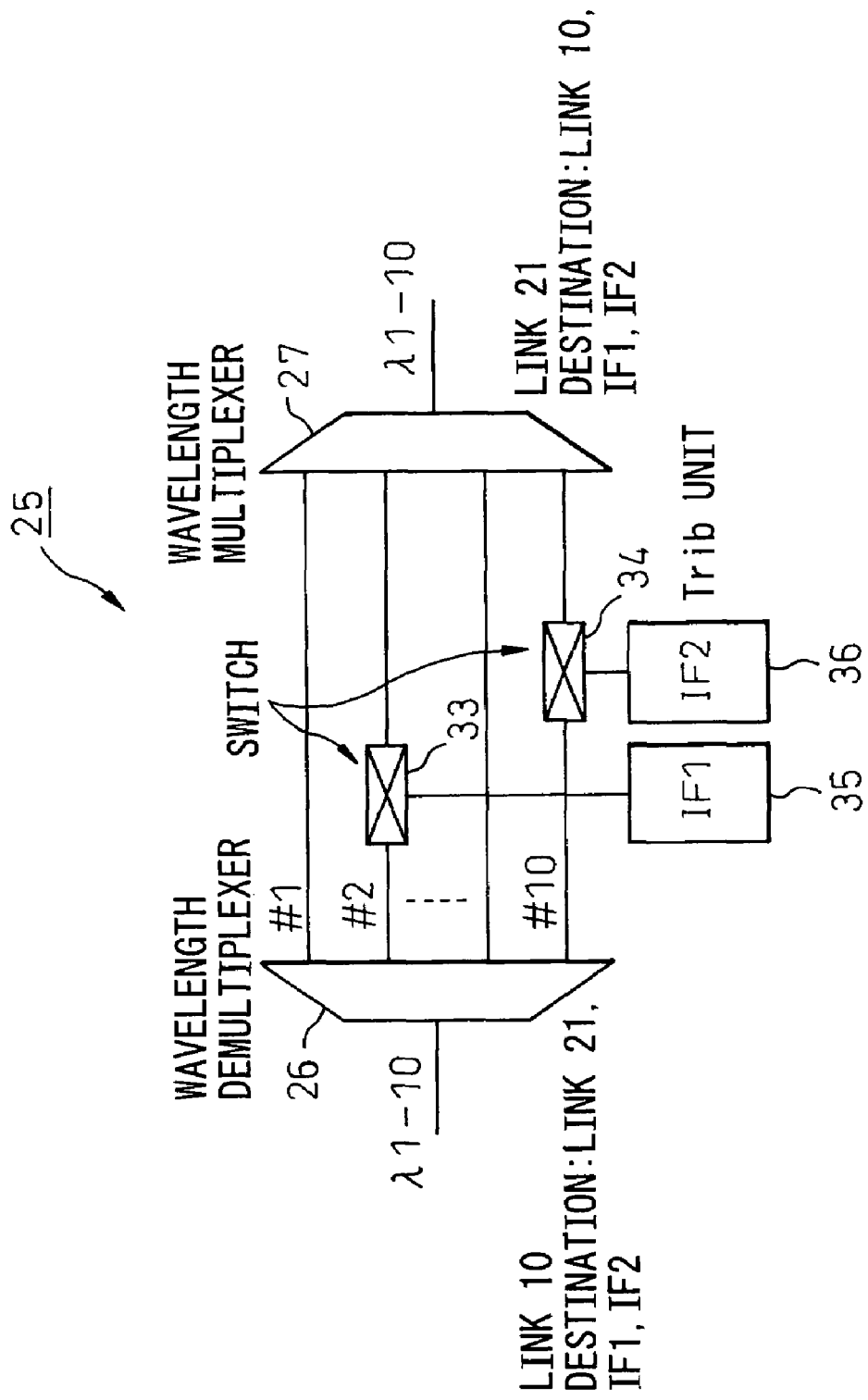

Fig.4(a)

| CLIENT LINK ID | WAVELENGTH INFORMATION | CONNECTED WDM LINK ID |
|---|---|---|
| 1 | $\lambda 2$ | 10, 21 |
| 2 | $\lambda 10$ | 10, 21 |
| : | : | |

Fig.4(b)

| WDM LINK ID | RING FLAG |
|---|---|
| 1 | ON |
| 2 | OFF |
| : | |

Fig.4(c)

| WDM LINK ID | RING FLAG | RING ID |
|---|---|---|
| 1 | ON | 1 |
| 2 | OFF | - |
| : | | |

Fig.4(d)

| WDM LINK ID | WAVELENGTH INFORMATION |
|---|---|
| 1 | $\lambda 1, 2, 3, 4$ |
| 2 | $\lambda 3, 5, 9$ |
| : | |

Fig.5

| INITIAL POINT WAVELENGTH | SPACING | WAVELENGTH VALUE | USABLE WAVELENGTH MAP |
|---|---|---|---|
| 195.30THz | 200G | 8 | 01011001 (0 AND 1 SIGNIFY WHETHER WAVELENGTH IS USABLE) |

Fig.8(a) N11 CLIENT LINK TABLE

| CLIENT LINK ID | WAVELENGTH INFORMATION | CONNECTED WDM LINK ID |
|---|---|---|
| 1 | λ5 | 10, 12 |
| 2 | λ8 | 10, 12 |
| .. | .. | .. |

Fig.8(b) N12 CLIENT LINK TABLE

| CLIENT LINK ID | WAVELENGTH INFORMATION | CONNECTED WDM LINK ID |
|---|---|---|
| 1 | λ5 | 21, 11 |
| 2 | λ10 | 21, 11 |
| .. | .. | .. |

Fig.8(c) N13 CLIENT LINK TABLE

| CLIENT LINK ID | WAVELENGTH INFORMATION | CONNECTED WDM LINK ID |
|---|---|---|
| 1 | λ3 | 12, 11 |
| 2 | λ10 | 12, 11 |
| .. | .. | .. |

Fig.8(d) N31 CLIENT LINK TABLE

| CLIENT LINK ID | WAVELENGTH INFORMATION | CONNECTED WDM LINK ID |
|---|---|---|
| 1 | λ5 | 31, 35 |
| 2 | λ8 | 31, 35 |
| .. | .. | .. |

Fig.8(e) N32 CLIENT LINK TABLE

| CLIENT LINK ID | WAVELENGTH INFORMATION | CONNECTED WDM LINK ID |
|---|---|---|
| 1 | λ7 | 33, 35 |
| 2 | λ9 | 33, 35 |
| .. | .. | .. |

Fig.8(f) N33 CLIENT LINK TABLE

| CLIENT LINK ID | WAVELENGTH INFORMATION | CONNECTED WDM LINK ID |
|---|---|---|
| 1 | λ1 | 31, 33 |
| 2 | λ8 | 31, 33 |
| .. | .. | .. |

US 7,657,180 B2

COMMUNICATION PATH CALCULATION METHOD AND MODULE

BACKGROUND OF THE INVENTION

1. Field of the Invention

The present invention relates to a communication path calculation method and module. More particularly, the present invention relates to a communication path calculation method and a module that are implemented or incorporated in a transmission apparatus (hereinafter referred to as a node) including a reconfigurable optical add/drop multiplexer (ROADM) which performs wavelength division multiplex (WDM), advertises information on a wavelength which can be added or dropped, as information on a link, and autonomously calculates a communication path on the basis of the information.

2. Description of the Related Art

In recent years, the generalized multi-protocol label switching (GMPLS) method has come into the spotlight as a novel technology for supporting a new-generation super-high-speed backbone, and it will soon be put to practical use. GMPLS is an extension of MPLS, which has been adapted to an IP virtual private network (VPN), and is intended to allow MPLS to be employed in an optical network. A label switching technique of assigning a label to a packet and switching paths on the basis of the label information can be used to transmit a light signal with respect to each wavelength. This permits high-speed switching with the light signal left intact. Moreover, GMPLS has high affinity with prior arts, because it can manage and control IP-based data communication, and has the advantage of allowing construction of a high-speed network that is highly scalable.

Conventionally, when a signaling protocol is used to dispersively determine a path, a GMPLS control plane calculates a path on the basis of information on a topology that is exchanged according to a routing protocol such as an open shortest path first-traffic engineering (OSPF-TE) routing protocol developed by the Internet engineering task-force. The information on the path is used to determine an end-to-end path in the process of signaling based on the resource reservation protocol-traffic engineering (RSVP-TE). At this time, a label indicating the path, (which represents a time slot in the case of the synchronous optical network (SONET) system adopting the synchronous digital hierarchy (SDH), or represents a wavelength in the case of a wavelength-division multiplexed (WDM) network), is assigned to a packet.

FIG. 1 shows an example of a WDM ring network having communication nodes in a ring configuration. FIG. 2 shows an example of the configuration of a communication node. FIG. 3 shows an example of the concrete configuration of a switch unit (SW) shown in FIG. 2.

In FIG. 1, the WDM network has nodes 1 to 4, each of which includes a ROADM module, interconnected in a ring configuration. The drawing indicates wavelengths λ1 to λ10 accommodated by the WDM ring network and wavelengths which a transponder incorporated in each of the nodes 1 to 4 can add or drop (for example, the node 1 can add or drop wavelengths λ1 to λ4 and λ7 to λ10). Ring Flag:ON in the drawing signifies, as described later in conjunction with FIG. 4B and FIG. 4C, that the nodes are interconnected in a ring configuration.

FIG. 2 shows an example of the configuration of each of the nodes 1 to 4 including a ROADM module or the like.

Typical transmission equipment includes an intra-equipment monitoring control unit 21 that manages and controls the equipment and that includes an equipment manager 22, which manages the equipment, and an alarm monitor 24, that monitors a transmission channel to detect a failure or the like. In this example, that includes the GMPLS control plane, the intra-equipment monitoring control unit 21 also includes a GMPLS controller 23 that controls a signaling facility. The present invention relates to the equipment manager 22 and GMPLS controller 23.

FIG. 3 shows an example of a concrete configuration including a switch unit 25 and interfaces 26 and 27 that are characteristic of the ROADM module.

The interfaces 26 or 27 are realized with wavelength multiplexers 26 each of which separates a WDM signal λ1-10, which is a bundle of signals of different wavelengths (ten wavelengths in this example), into individual signals of different wavelengths, or wavelength demultiplexers 27 each of which combines the signals of different wavelengths so as to restore the original WDM signal λ1-10. An optical amplifier that is not shown may be incorporated in each of the wavelength multiplexers 26 or wavelength demultiplexers 27.

The switch unit (SW) 25 includes switches 33 and 34 which are connected to WDM links 10 and 21 respectively that deal with the WDM signal λ1-10, so that the node can be reconfigured. The switch 33 selects whether a signal 2 that has a certain wavelength and is one of signals resulting from multiplexing should be added or dropped or passed through a transponder 1 (IF1). The switch 34 selects whether a signal 10 that has a certain wavelength and is one of the signals resulting from multiplexing should be added or dropped or passed through a transponder 2 (IF2).

Moreover, publicly-known literature has disclosed that wavelength-division multiplexing (WDM) transmission equipment notifies a SONET/SDH system of the identifier of an interface and a wavelength to be passed through the interface and that, if a failure occurs, the SONET system notifies the WDM equipment of the wavelength (refer to Patent Document 1).

Patent Document 1: Japanese Unexamined Patent Publication No. 2004-522691

However, as far as reconfigurable optical add/drop multiplexers (ROADMs) interconnected over a WDM network are concerned, the wavelength each ROADM can add or drop is determined on a fixed basis according to a physical line led to an input/output port of a transponder or the like included in each node. Conventionally, the information on the wavelength has not been advertised using the OSPF routing protocol or the like. Therefore, a path cannot be automatically calculated. This poses a problem in that maintenance and operation personnel have to manually enter information on restrictions to be imposed on routing.

According to the conventional GMPLS method (OSPF-TE routing protocol), a switch included in equipment is supposed to work in a non-blocking manner. No consideration is taken into a blocking ability inherent to transmission equipment including a ROADM or the like. A path cannot be calculated using information on a network acquired using the OSPF-TE routing protocol. In efforts to solve this problem, a link at which restrictions are imposed is manually designated or a network management system is used to calculate a path. This is time-consuming.

Moreover, in the aforesaid first example, information on a wavelength and information on an interface are provided. In the present application, pieces of information on intra-equipment connections are also provided. Moreover, in the aforesaid first example, information is exchanged between adjoining pieces of equipment. In the present application, information is exchanged within an entire ring or network.

SUMMARY OF THE INVENTION

The present invention addresses the foregoing problems. An object of the present invention is to provide a communication path calculation method that enables automatic calculation of a path by appending information on a wavelength to information on a port (link) at which a wavelength is added or dropped, and appending information on a ring to information on a link included in a ring, and that facilitates quick provision of services.

According to the present invention, there is provided a communication path calculation method to be implemented in optical transmission equipment that is accommodated in a WDM network over which a wavelength-division multiplexed (WDM) signal is transferred and that includes a reconfigurable optical add/drop multiplexer (ROADM) module. The OADM module creates a link table listing clients of the own equipment and connected wavelength-division multiplexers (WDMs), and advertises the link table to the other pieces of equipment accommodated by the network as pieces of information on restrictions to be imposed on routing from the own equipment. The other pieces of equipment each receive and store the advertised pieces of information on restrictions to be imposed on routing, and use the pieces of information as pieces of information on restrictions to be imposed on a calculation to calculate a communication path. A shortest path calculation algorithm is used to calculate the communication path, and the pieces of information on restrictions to be imposed on routing are applied to calculation of the shortest path.

According to the present invention, as seen from examples of the structure of a link table shown in FIG. 4A to FIG. 4D and an example of the structure of wavelength information shown in FIG. 5, the link table contains, for example, at least connected WDM link identifiers (IDs) with which WDM links connected to the OADM module are identified, client link IDs with which input/output ports of a transponder incorporated in the OADM module are identified, and pieces of information on wavelengths with which signals of different wavelengths to be added or dropped over the respective WDM links are identified.

Furthermore, according to the present invention, there is provided optical transmission equipment that is accommodated in a WDM network over which a wavelength-division multiplexed (WDM) signal is transferred and that includes a reconfigurable optical add/drop multiplexer (ROADM) module. The OADM module includes: an intra-equipment monitoring control unit that monitors, manages, and controls the equipment and that includes an equipment manager that manages the equipment, an alarm monitor that monitors a transmission channel to detect a failure, and a GMPLS controller that controls label switching and includes a signaling facility; and a switch unit that extends control so that the equipment can be reconfigured. The equipment manager creates a link table listing clients of the own equipment and connected WDMs. The GMPLS controller advertises the link table to the other modules accommodated by the network as information on restrictions to be imposed on routing from the module, stores pieces of information on restrictions to be imposed on routing which are received from any other equipment, and uses the stored pieces of information as pieces of information on restrictions to be imposed on calculation to calculate a communication path. The optical transmission equipment uses a shortest path calculation algorithm to calculate the communication path, and applies the pieces of information on restrictions to be imposed on routing to the calculation of the shortest path. A Dijkstra method is adopted as the shortest path calculation algorithm, and the OSPF routing protocol is used to control routing.

According to the present invention, information on a wavelength is appended to information on a port (link) at which a wavelength is added or dropped, and information on a ring is appended to information on a WDM link included in the ring. Thus, automatic path calculation is enabled, and rapid provision of services is facilitated.

BRIEF DESCRIPTION OF THE DRAWINGS

The present invention will be more clearly understood from the description as set forth below with reference to the accompanying drawings.

FIG. 1 shows an example of a WDM ring network having communication nodes interconnected in a ring configuration;

FIG. 2 shows an example of the configuration of a communication node shown in FIG. 1;

FIG. 3 shows an example of a concrete configuration including a switch unit shown in FIG. 2;

FIG. 4A to FIG. 4D show examples of the structure of a link table;

FIG. 5 shows an example of the structure of information on a wavelength;

FIG. 8A to FIG. 8F show examples of a client link table included in the network architecture shown in FIG. 7.

DESCRIPTION OF THE PREFERRED EMBODIMENTS

Figure 6:
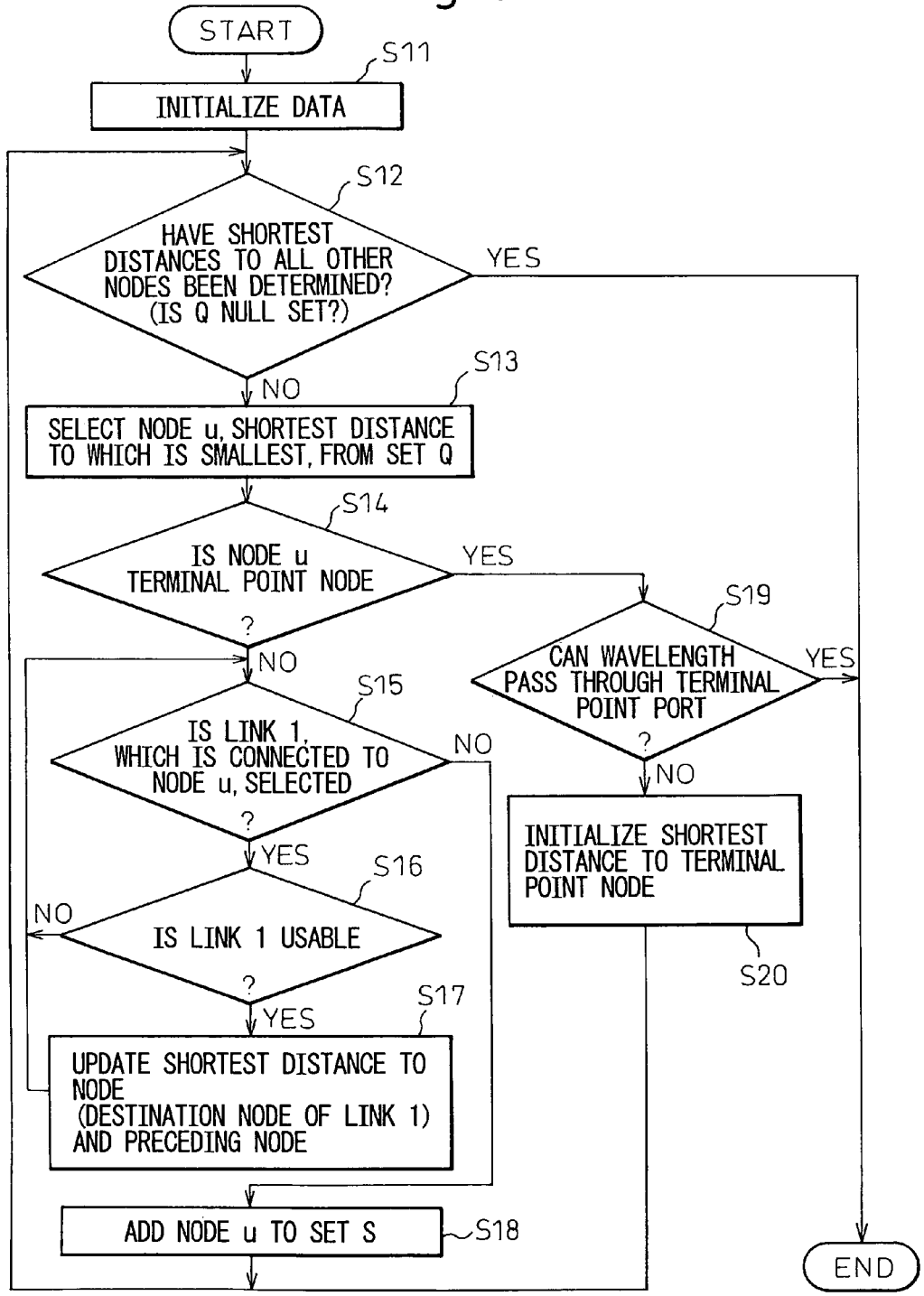
FIG. 6 shows an example of a basic shortest path search procedure employed in the present invention.
Figure 7:
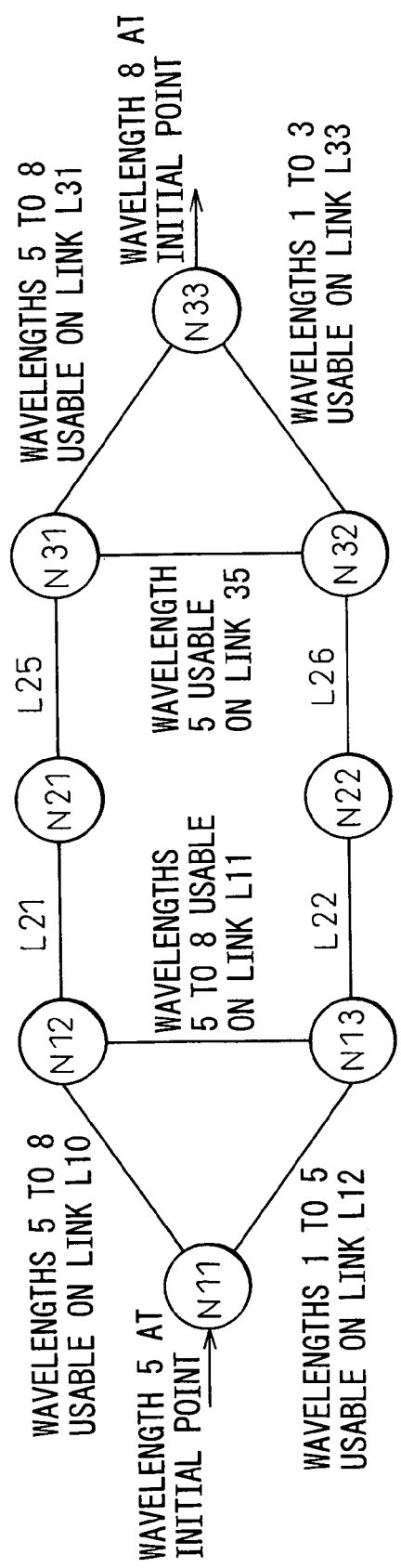
FIG. 7 shows an example of a network architecture in which the present invention is implemented.

FIG. 6 shows an example of a basic shortest path search procedure employed in the present invention. FIG. 7 shows an example of a network architecture in which the present invention is implemented. FIG. 8A to FIG. 8F show examples of a client link table included in the network architecture shown in FIG. 7.

The shortest path search procedure described in FIG. 6 is based on a technique of solving a shortest path problem defined by a graph theory using a Dijkstra method that is a standard algorithm employed in the OSPF routing protocol. Every time a decision is made, restrictions contained in each of the client link tables shown in FIG. 8A to FIG. 8F respectively are taken into consideration. A network shown in FIG. 7 includes two ROADM rings (N11-N12-N13 and N31-N32-N33) and two optical cross-connects (OXC) (N21 and N22) that link the ROADM rings. Herein, an embodiment will be described in a case that a path from a port of a node N11 that can have a wavelength 5 to an output port of a node N33 that can have a wavelength 8, is searched according to the path search procedure. Herein, for brevity's sake, all link costs shall be regarded as "1"s.

(1) First of all, data is initialized (S11). Consequently, the node N11 is regarded as an initial point node. The shortest path d(N11) from the initial point node N11 is set to 0, and a wavelength L(N11) usable at the node N11 is set to the wavelength 5. The shortest path d(U) to any other node U is set to ∞, and the wavelength L(U) usable at the node U is set to null.

(2) At step S12, as the shortest distances from the initial point node N11 to all the other nodes are not determined (a set Q of nodes having the shortest distances thereto undetermined is not a null set), a decision is made in the negative.

(3) At step S13, a point u which is included in the set Q and the shortest distance d(u) to which is the smallest is the node N11. At step S14, as the point u is not a terminal point node (N33), a decision is made in the negative.

(4) At step S15, WDM links connected to the point u (herein the node N11) are links L10 and L12. According to the present invention, an N11 client link table (FIG. 8A) is referenced to check the connected WDM link IDs. As the port through which the wavelength 5 can pass can be connected to the client link ID1 (IF1), the links L10 and L12 are recognized as candidates (OK). At step 15, either of links connected to the selected node u is selected. The client link table is referenced to check if the links can be selected.

(5) At step 16, the link L10 is first checked. As the wavelength L(N11) is set to the wavelength 5 and the wavelengths usable on the link L10 are set to wavelengths 5 to 8, the wavelength 5 is usable. Consequently, a decision is made in the affirmative. As mentioned above, at step 16, a wavelength band is checked as usual, and a decision is made on whether a wavelength is usable.

(6) At step 17, as the destination node of the link L10 is the node N12, the shortest distance d(N12) of ∞ is compared with the sum of the shortest distance d(N11) and a link budget (L10). The smaller value of the shortest distance d(N12) and the sum is adopted as the shortest distance d(N12). In this case, the shortest distance d(N12) is set to 1. A node R(N12) immediately preceding the node N12 along the shortest path from the initial point to the node u is set to the node N11. The wavelength L(N12, L10) is set to the wavelength 5. At step 17, the shortest distance and the preceding node are updated. In addition to these pieces of information, the wavelength usable on the link from the preceding node is preserved.

(7) Steps 16 and 17 are performed relative to the link L21. Consequently, the shortest distance d(N13) is set to 1, and the wavelength L(N13, L12) is set to the wavelength 5.

(8) Control is then returned to step 15. As the links L10 and L12 have been selected, a decision is made in the negative. Control is then passed to step 18. The node N11 is added to a set S of nodes having the shortest distances thereto determined.

(9) Control is then returned to step 12. As all nodes do not have the shortest distances thereto determined, a decision is made in the negative. Control is then passed to step 13.

(10) At step 13, a node, the shortest distance d(u) to which is the smallest, is selected. Herein, the shortest distances to the nodes N12 and N13 are 1 or the smallest. The node N12 is selected anyhow.

(11) At step 14, as the links L21 and L11 are connected to the node N12, an N12 client link table (FIG. 8B) is referenced to check the connected WDM link IDs. Whether the port through which the wavelength 5 can pass is connectable is checked. As the port is connectable (OK), the links L21 and L11 are regarded as candidates.

(12) Steps 16 and 17 are performed relative to the link L21. Consequently, the shortest distance d(N21) is set to 2, and the preceding node R(N21) is set to the node N12. The wavelength L(N21, L21) is set to null.

(13) Steps 16 and 17 are performed relative to the link L11. As the sum of the shortest distance d(N12) and the link budget (L11) is 2 and larger than the current shortest distance d(N13), the shortest distance d(N13) is not updated.

(14) Control is returned to step 15. As the links L21 and L11 have been selected, a decision is made in the negative. Control is then passed to step 18. The node N12 is added to the set S.

(15) Control is returned to step 12. As the shortest distances to all nodes have not been determined, a decision is made in the negative. Control is then passed to step 13.

(16) At step 13, a node, the shortest distance d(u) to which is the smallest, is selected. The node N13 whose link budget is 1, and the shortest distance to which is the smallest, is selected.

(17) At step 15, the links L11 and L22 are connected to the respective nodes. As for the link L22, an N13 client link table (FIG. 8C) demonstrates that the wavelength 5 cannot be inserted into a signal to be put on the link L22. The link L22 cannot therefore be selected. Based on the link table, only the link L11 can be selected, and steps 16 and 17 are performed relative to the link L11. As the shortest distance d(N12) is smaller than the sum of the shortest distance d(N13) and the link budget (L11), the shortest distance d(N12) is not updated but the node N13 is added to the set S.

(18) Control is returned to step 13. Herein, the node N21, the shortest distance d(u) to which is the smallest, is selected.

(19) At step 15, a link L25 connected to the node N21 is selected. As a client link table is unavailable, no restrictions are recognized and imposed. The link L25 is selected as it is, and steps 16 and 17 are performed relative to the link L25. The link budget d(N31) is set to 3, and the preceding node R(N31) is set to the node N21. The wavelength L(N31, L25) is set to null. The node N21 is added to the set S.

(20) Likewise, the node N31 whose link budget is the smallest is selected. An N31 client link table (FIG. 8D) is referenced to check whether the links L31 and L35 can be selected. The wavelengths usable on the links L31 and L35 respectively are checked and the link budgets thereof are updated. Herein, the shortest distance d(N33) is set to 4, and the preceding node (N33,L31) is set to the node 31. The wavelength L(N33, L31) is set to the wavelengths 5 and 8. The shortest distance d(N32) is set to 4, the preceding node R(N32,L35) is set to the node N31, and the wavelength L(N32,L35) is set to the wavelength 5.

(21) Thereafter, the node N32, whose link budget is the smallest, is selected.

(22) The link L33 connected to the node N32 is selected. Although the link L33 is connectable because it is identified with a connected WDM link ID, the wavelength 5 cannot be used on the link L33. The selection of the link L33 is canceled (FIG. 8E), and the node N32 is added to the set S.

(23) Finally, the node N33 is selected. As the node N33 is a terminal point (step 14) and the wavelength 8 usable at the terminal point is recognized as a wavelength which can be inserted into a signal, according to a client link table (FIG. 8F), the procedure is terminated (a decision is made in the affirmative at step S19).

(24) Consequently, a path is determined based on the preceding node R(N33) that is the node N31, the preceding node R(N31) that is the node N21, the preceding node R(N21) that is the node N12, and the preceding node R(N12) that is the node N11. Moreover, as the wavelength L(N33) is the wavelength 8 and the wavelength L(N12) is the wavelength 5, the wavelengths usable on the respective links are determined.

As mentioned above, according to the present invention, as client link tables advertised by respective nodes are referenced, a route can be determined in consideration of various restrictions. Specifically, the client link table is referenced to decide whether a link bearing a certain connected WDM link ID is connectable. Moreover, the client link table is referenced to find it a specific wavelength cannot be inserted into a signal. Eventually, the shortest communication path can be automatically calculated.

What is claimed is:

1. A communication path calculation method to be implemented in optical transmission equipment that is accommodated in a WDM network over which a wavelength-division multiplexed signal is transferred and that includes a reconfigurable OADM module, wherein:

the OADM module creates a link table listing clients of the own equipment and connected WDMs;

the link table is advertised to the other pieces of equipment accommodated by the network as pieces of information on restrictions to be imposed on routing from the own equipment;

the other pieces of equipment each receive and store the advertised pieces of information on restrictions to be imposed on routing, and use the pieces of information as pieces of information on restrictions to be imposed on calculations to calculate a communication path from the own equipment, and when a communication path is calculated, a shortest path calculation algorithm is used and the pieces of information on restrictions to be imposed on routing are applied to the calculation of the shortest path, wherein the link table contains at least WDM link IDs with which WDM links to be connected to the OADM module are identified, ring flags indicating whether the respective WDM links are included in a ring, and ring IDs with which WDM rings are identified if a plurality of WDM rings exists.

2. The communication path calculation method according to claim 1, wherein the link table further contains pieces of information on wavelengths with which signals of different wavelengths usable on the respective WDM links are identified.

3. The communication path calculation method according to claim 2, wherein the information on a wavelength contains at least a wavelength at an initial point, a spacing between signals of different wavelengths, a wavelength value, and a usable wavelength map that is a flag bit stream representing the usable wavelength.

4. Optical transmission equipment that is accommodated by a WDM network over which a wavelength-division multiplexed signal is transferred and that includes a reconfigurable OADM module, wherein:

the OADM module includes: an intra-equipment monitoring control unit that monitors, manages, and controls the equipment and that includes an equipment manager which manages the equipment, an alarm monitor which monitors a transmission channel to detect a failure, and a GMPLS controller which includes a signaling facility and controls label switching; and a switch unit that extends control so that the equipment can be reconfigured;

the equipment manager creates a link table listing clients of the own equipment and connected WDMs;

the GMPLS controller advertises the link table to the other pieces of equipment accommodated by the network as pieces of information on restrictions to be imposed on routing from the own equipment, stores pieces of information on restrictions to be imposed on routing which are received from any other equipment, and uses the received pieces of information as pieces of information on restrictions to be imposed on calculation to calculate a communication path from the own equipment, and when a communication path is calculated, a shortest path calculation algorithm is used and the pieces of information on restrictions to be imposed on routing are applied to the calculation of the shortest path, wherein the link table contains at least WDM link IDs with which WDM links to be connected to the OADM module are identified, ring flags indicating whether the respective WDM links are included in a ring, and ring IDs with which WDM rings are identified if a plurality of WDM rings exists.

5. The optical transmission equipment according to claim 4, wherein the Dijkstra method is adopted as the shortest path calculation algorithm, and the OSPF-TE routing protocol is used to control routing.

* * * * *